UNITED STATES PATENT OFFICE.

WALTER D. FIELD, OF NEWARK, NEW JERSEY, ASSIGNOR TO THE LAKOID MANUFACTURING COMPANY, OF NEW JERSEY.

PATENT-LEATHER AND PROCESS OF MAKING SAME.

SPECIFICATION forming part of Letters Patent No. 627,493, dated June 27, 1899.

Application filed March 5, 1898. Serial No. 672,749. (No specimens.)

*To all whom it may concern:*

Be it known that I, WALTER D. FIELD, a citizen of the United States, residing at Newark, in the county of Essex and State of New Jersey, have invented certain new and useful Improvements in Patent-Leather and Processes of Making the Same, of which the following is a specification.

My invention relates to patent, enameled, japanned, or varnished leather or similar flexible material and to processes for making the same.

It has for its object the production of a patent-leather, &c., the finish of which will not crack or age so quickly as that of patent-leathers at present made and that will be more flexible and yet stronger.

It consists of the processes and product herein set out.

It is well known that in the manufacture of patent, enameled, japanned, or varnished leather several coats are applied and that each coat has to be heated to some extent in order to produce the material sought. This method of long-continued heating of the leather tends to destroy its pliability and strength, and this is true of bark-tanned leather and even more so of chrome-tanned leather. In fact the use of chrome-tanned leathers in the patent-leather industries has up to the present time been prevented by this necessity of artificially heating the leather during the process. It has also been known in the patent-leather industries that the thinner the coats of varnish that could be applied to the leather to produce the gloss the less liability there would be of the enameling cracking. In the ordinary production of the patent-leather for shoes, tipping, or vamps it was necessary really to so prepare the previous coats that the varnish could not penetrate the coatings and render them brittle. It is also true that up to the present time no flexible coatings have been produced outside of rubber and oil. The oil coating has been the one used in the manufacture of patent-leather, the oil having been prepared by boiling until it was in the condition of "sweet meats" or "long daub," "short daub," &c., and then these materials have been applied as the operator wished. In varnishing, coats made with any of these materials the varnish has had to be thick and not thin, because if thin it would penetrate the inner coatings and render the patent-leather brittle. It is also a very well-known fact in the industries where linseed-oil and its products are used that all the coatings caused by the oxidation of linseed-oil are more or less brittle and become more and more brittle with age, so that shoe-manufacturers and other users of patent and enameled leather always try to get fresh leather and use it as soon as possible. My invention avoids these defects and produces upon skins, hides, or split hides or any leather or any absorbent flexible material a coating that will not oxidize, (and so become rancid and brittle,) that will be flexible and yet tough, and that will hold the varnish on the surface of the coating. In other words, I produce a flexible non-penetrable coating on an absorbent flexible material and then varnish it with a thin flexible varnish.

In carrying out my invention I first prepare a composition containing pyroxylin, a thickened non-drying oil, and a solvent that is a solvent of both the other ingredients. The thickened non-drying oil may be prepared in the usual way by blowing with air, as is well known in the art of compounds of blown oil and pyroxylin. The group of thickened non-drying oils that are suitable for the purposes of my invention are generally the glycerids of the unsaturated fatty acids. Castor-oil, after blowing with air or boiling in an open kettle until thick, may be used for the purposes of my invention. It is, however, not as good an oil for the purpose as corn-oil, cotton-seed oil, cod-liver oil or menhaden-oil, olive-oil, and peanut-oil.

In preparing the composition for the inner coating I preferably take fifteen gallons, more or less, of amyl actetate and dissolve in it fifteen pounds of soluble cotton or pyroxylin. When this is thoroughly dissolved, I take fifty or sixty pounds of thickened non-drying oil, in which has been ground the desired quantity of pigment, (one to two pounds of black pigment would answer,) and slowly incorporate it with the solution of soluble cotton in the amyl acetate. This mixture is now ready to apply to the leather or other absorbent material, and in doing this I may use the ordinary "slicker" of the art. After applying several coats and drying them between each coat, which is preferably done by exposure for twelve hours to ordinary atmospheric temperatures without artificial heat, (preferably supplemented by a sunning for five or six hours without artificial heat,) the leather is ready to varnish. For varnishing any suitable oil-varnish is used, except that it is used in a much more fluid condition than has heretofore been possible in the making of patent-leathers, &c.—that is to say, it is a thin varnish in contrast with the ordinary varnish heretofore used for the purpose. In fact, it contains one-third more diluent than the varnish ordinarily used by patent-leather manufacturers. The varnish coat may be dried in the usual way by five or six hours of artificial heat. The nature of the inner composition or coating used is such that this thin varnish, although of high penetrating properties, does not penetrate it, but remains upon it in the form of a continuous adhesive glossy film that is flexible and does not crack and does not separate from the inner coatings. In this way a thin and flexible outer varnish coating can be produced on patent-leather thinner and more flexible than has heretofore been possible and more durable. The oil used in the pyroxylin compound—that is to say, the thickened non-drying oil—must be thickened to such a point that it will not exude or spew or sweat out on the surface of the coating when the coated leather is dried. If unthickened oil were used in this inner pyroxlin coating, it would grow rancid and the film would decompose in a very short time and would not have the required stability.

It is one of the objects of the introduction of the non-drying oil into the composition of the inner pyroxylin coating to prevent the contraction of the pyroxylin film as well as to render and keep it more flexible. In the use of pyroxylin solutions for wood-fillers or for laying the grain of wood, it is this contraction of the pyroxylin film that is especially operative and desirable. In the case of patent-leather, &c., such contraction would be undesirable.

By my invention chrome-tanned leather can be used in the manufacture of patent, enameled, &c., leather. Moreover, the process may be conducted without subjecting the leather to artificial heats (excepting only in drying the final varnish coat)—that is to say, it may be conducted at ordinary atmospheric temperatures—such as are obtained, for instance, outdoors in the shadow or in the sunshine—and this is the preferred form of the process. As a result the leather escapes the permanent injury that is inevitably caused it by long-continued artificial heat. Consequently my improved patent-leather is stronger and more durable than what has been made heretofore. By my invention also thinner and more flexible coatings, and therefore more durable coatings, can be applied to the leather. By my invention also the outer varnish coating does not penetrate the leather or the inner coatings, and the brittleness that results from such penetration in ordinary patent-leathers is therefore avoided.

What I claim as new, and desire to secure by Letters Patent, is—

1. The process of making patent, enameled, japanned or varnished leather or other absorbent material, which consists in applying to the surface of the leather or other absorbent material a flexible coating containing pyroxylin and an oxidized or thickened non-drying oil dissolved in a solvent of both, and subsequently applying a flexible coating composed of a thin varnish, substantially as described.

2. The process of making patent, enameled, japanned or varnished leather, which consists in applying to the surface of the leather at ordinary atmospheric temperatures a flexible coating containing pyroxylin and an oxidized or thickened non-drying oil dissolved in a solvent of both, and subsequently applying a flexible coating composed of a thin varnish, substantially as described.

3. As a new article of manufacture, a flexible patent, enameled, japanned or varnished leather or other absorbent material, having an inner thin flexible coating containing pyroxylin and an oxidized or thickened non-drying oil, and an outer thin flexible coating composed of varnish, substantially as described.

In testimony whereof I have signed my name to this specification in the presence of two subscribing witnesses.

WALTER D. FIELD.

Witnesses:
JAS. C. HOWELL,
GEO. W. MILLS, Jr.